US011175570B2

(12) United States Patent
Arvidsson et al.

(10) Patent No.: US 11,175,570 B2
(45) Date of Patent: Nov. 16, 2021

(54) MOUNT FOR AN IMAGE CAPTURING DEVICE

(71) Applicant: Axis AB, Lund (SE)

(72) Inventors: Christoffer Arvidsson, Lund (SE); David Fagerkvist, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/875,335

(22) Filed: May 15, 2020

(65) Prior Publication Data

US 2020/0363706 A1    Nov. 19, 2020

(30) Foreign Application Priority Data

May 17, 2019  (EP) .................................... 19175185

(51) Int. Cl.
| | |
|---|---|
| *G03B 17/56* | (2021.01) |
| *F16M 11/12* | (2006.01) |
| *H04N 5/225* | (2006.01) |

(52) U.S. Cl.
CPC ......... *G03B 17/561* (2013.01); *F16M 11/121* (2013.01); *H04N 5/2252* (2013.01)

(58) Field of Classification Search
CPC .... G03B 17/561; G03B 17/566; H04N 5/232; H04N 5/23299; H04N 5/2252; F16L 3/01; F16L 3/015; F16L 3/02; F16M 11/125; F16M 11/04; F16M 11/06; F16M 11/08; F16M 11/10; F16M 11/105; F16M 11/12; F16M 11/121; F16M 11/123; F16M 11/126; F16M 11/128; F16M 11/18; F16M 11/2007; F16M 11/2014; F16M 11/2021; F16M 11/2028; F16M 11/2035; F16M 11/2042; F16M 11/205; F16M 11/2057;

(Continued)

(56) References Cited

U.S. PATENT DOCUMENTS

| | | | |
|---|---|---|---|
| 3,689,695 A | | 9/1972 | Rosenfield et al. |
| 5,028,997 A | * | 7/1991 | Elberbaum ............ F16M 11/18 348/143 |

(Continued)

FOREIGN PATENT DOCUMENTS

CN  108758232 A  11/2018

OTHER PUBLICATIONS

Extended European Search Report dated Nov. 29, 2019 for the European Patent Application No. 19175185.8.

*Primary Examiner* — Clayton E. LaBalle
*Assistant Examiner* — Fang-Chi Chang
(74) *Attorney, Agent, or Firm* — Volpe Koenig (57) ABSTRACT

A mount for an image capturing device comprising a fixed frame, and a support frame arranged to support an image capturing device. The support frame is attached to the frame by a pivot joint defining a pivot axis for the support frame relative to the fixed frame, and an adjustment joint for adjusting a pivot position for the support frame comprising a first element forming a first contact surface, and a second element forming a second contact surface. The first element is arranged to be moved along a linear axis that traverses the pivot axis and that extends trough a plane of the contact surfaces. At least one of the contact surfaces is curved. The first and second elements are arranged to be magnetically connected during abutment. A system and method for adjustment are also disclosed.

12 Claims, 5 Drawing Sheets

(58) Field of Classification Search
CPC ............ F16M 11/2064; F16M 11/2071; G02B 7/1828; G02B 7/003; G02B 7/004; G02B 7/005; F16C 11/04; F16C 11/06
See application file for complete search history.

(56) References Cited

U.S. PATENT DOCUMENTS

| | | |
|---|---|---|
| 5,933,668 A | 8/1999 | Hyers |
| 8,154,653 B2 | 4/2012 | Chapman |
| 2003/0001963 A1 | 1/2003 | Masuyama et al. |
| 2004/0119881 A1* | 6/2004 | Matko .................... B60R 11/04 |
| | | 348/375 |
| 2006/0115265 A1 | 6/2006 | Elberbaum |
| 2007/0171553 A1 | 7/2007 | Rigney |
| 2010/0296188 A1 | 11/2010 | Harland et al. |
| 2015/0184792 A1 | 7/2015 | Maier |
| 2019/0086634 A1 | 3/2019 | Krylov |

\* cited by examiner

MOUNT FOR AN IMAGE CAPTURING DEVICE

TECHNICAL FIELD

The present invention relates to the field of mounts for image capturing devices. In particular, the application discloses a mount for an image capturing device with an adjustment joint for adjusting a pivot position.

BACKGROUND

Image capturing devices, such as visual light cameras or thermal cameras, are continuously improved and developed to, e.g., get higher resolution image sensors or become smaller. These improvements are positive for the performance of the device. However, some of them result in a need for increased alignment precision, e.g., when setting a desired field of view. One way to adjust a camera device's field of view is by its panning and/or tilting position. For this purpose, the camera capturing device is adjustable mounted with adjustment elements, such as screws that change a pan/tilt position when adjusted. Springs provide a counteracting force to the screw push force and the image capturing device is thereby held in a current pan/tilt position. This solution is common and can work well in some aspects. However, it may be desirable to decrease the number of components that are needed for the alignment, as well as the size of such alignment mechanism. Moreover, it may be beneficial to improve the precision of the alignment to meet the increasing alignment demands that comes with an increased image quality.

Alignment of an image capturing device, for example by adjusting a pan or tilt position, may be used in different scenarios for the device. For example, during manufacturing and assembly of the device, adjustment may be performed to align a first and second camera device of an imaging system. Also, when the camera is mounted in field and in use, the need for alignment can arise during setup or following that the device position has been affected by outer forces from, e.g., tampering attempts or harsh weather conditions.

One example of alignment scenario is during assembly of paired cameras that are supposed to have aligned (the same or at least overlapping) fields of view. The camera pair can for example include a thermal camera paired with a visual light camera. In this scenario, a precise alignment method is desired to adjust the pan and tilt position of one or both cameras. Moreover, it is important to be able to maintain a set position.

It is evident that there is a need for improvements within this field, with regards to precision, size and flexibility, to meet the increasing demands that comes with the continuous development of image capturing devices.

SUMMARY

Providing a mount for an image capturing device that offers an increased precision in adjustment or alignment and which is less complex than current solutions would be beneficial. Moreover, a mount that is easy to set up and user-friendly since alignment is in many cases performed manually would also be preferred.

According to a first aspect, a mount for an image capturing device comprises a fixed frame, and a support frame arranged to support an image capturing device. The support frame is attached to the fixed frame by a pivot joint defining a pivot axis for the support frame relative to the fixed frame, and an adjustment joint for adjusting a pivot position for the support frame. The adjustment joint comprises a first element arranged in one of the support frame and the fixed frame and forms a first contact surface, and a second element arranged in the other of the support frame and the fixed frame and forms a second contact surface. The first element and the second element are arranged to abut at the first and second contact surfaces. The first element is further arranged to be moved along a linear axis that traverses the pivot axis and that extends trough a plane of the contact surfaces. At least one of the contact surfaces is curved. The first and second elements are arranged to be magnetically connected during abutment, thereby allowing a pivot position of the support frame relative to the frame to be adjusted by a linear movement of the first element.

In other words, a mount to which an image capturing device, such as a camera of any type, can be attached is provided. One purpose of the mount is to allow a controlled adjustment of a pivot movement for the image capturing device. For this purpose, the image capturing device is fixedly attached to a support frame of the mount. The support frame is in turn attached to the fixed frame of the mount by a pivot joint that allows the support frame, and thereby also the image capturing device, to rotate about a pivot axis. The pivot axis is thus defined by the pivot joint and may be selected to coincide with a tilt or pan axis for the image capturing device. By fixed frame is indicated that the frame is, relative the support frame, fixedly attach to other structures of, e.g., the mount. However, as will be exemplified in the description, the fixed frame may in turn be adjustable relative to the other structures.

The pivot joint can for example be a screw that connects the frame and the support frame, and the pivot axis is in that case defined by the screw axis. Hence, the image capturing device is securely arranged in the support frame and the support frame is rotatably attached to the frame. Further, the support frame and the frame are connected by the adjustment joint that is based on a magnetic connection between two elements (the first and second elements). By a combination of the magnetic connection, the linear movement of one of the elements, and the curved contact surface of one of the element's contact surfaces, a controlled adjustment of the pivot movement of the support frame, and thus the image capturing device, is obtained without requiring any further elements or joints in the mount. That is, a counteracting force in the form of a spring, that is common in current solutions, is not required in the inventive solution. Moreover, the pivot position of the support frame can be adjusted back and forth without loosing connection in the adjustment joint thanks to the magnetic coupling.

The fixed frame may be located outside the support frame. The support frame may be a housing in which the image capturing device can be located and attached. The image capturing device may be attached by any suitable attachment means that are all well-known, including screws, adhesives, and form-fitting.

The mount may further comprise fixing organs arranged to fix a pivot position of the support frame. The fixing organs may be arranged to fix the relative position of the fixed frame and the support frame. The fixing organs may be provided in the form of screws or the like that are arranged in the fixed frame and arranged to press to provide a fixating friction force on the support frame when adjusted inwards.

In a one embodiment, the linear axis is perpendicular to the pivot axis to maximize the amount of force that is translated between the movement of the first element and the pivot movement.

The first and second elements may be releasably connected. Furthermore, the magnetic connection may be released when a separating force between the first and second elements exceeds a threshold. The threshold is defined by the design (selection) of the first and second elements, and in particular the magnetic connectors thereof. An advantage provided by the releasable connection is that the frame and the support frame may disconnect from each other if any of the frame and support frame is subjected to an external force or impact. The mount, and in particular the image capturing device, may thereby be protected from external forces and impacts since the support frame and fixed frame are decoupled to prevent translation of force therebetween.

The mount may further comprise an electromagnet arranged to provide the magnetical connection between the first and second elements. The electromagnet may be electrically coupled to the image capturing device for powering, or indeed be powered from a separate power supply. A control unit arranged to switch the electromagnet on and off may be arranged in the image capturing device. The electromagnet may be any suitable type of electromagnet that is known to the skilled person.

The contact surface may have different forms in different embodiments. In one embodiment, one of the contact surfaces is convex, and the other contact surface is flat. In another embodiment, one of the contact surfaces is convex, and the other contact surface is concave and forming a recess arranged to receive the convex contact surface. In yet another embodiment, one of the first and second elements comprises a cylindrical rod providing a curved contact surface and wherein the other of the first and second elements forms a flat contact surface.

The above embodiments are provided as non-limiting examples. Other forms and combinations of contact surfaces are possible within the scope of the claims.

The first element may be arranged to said one of the support frame and the fixed frame so as to be retrofittable thereto, i.e. it may be configured to be attached and removed (released) freely. In other words, one of the elements may be arranged as a tool that can be attached to the mount when adjustment is needed, and removed when the adjustment is finalized. To achieve a retrofittable solution, the fixed frame or support frame on which the first element is attached, may comprise an attachment element, such as a rod or magnetic connector, to which the first element may be attached. The first element is in such embodiment arranged with corresponding attachment means to connect to the attachment element. An advantage with a retrofittable first element is that the first element may be used to adjust many mounts, for example during assembly of image capturing devices.

Additionally, it is more difficult to adjust the mount without the tool, which at least reduces the risk of adjusting a mount by mistake or in an uncontrolled manner.

In one embodiment, the mount comprises a further, second frame attached to the fixed frame, in this embodiment defined as a first frame, by a second pivot joint defining a second pivot axis for the first frame relative to the second (further) frame, and a second adjustment joint for adjusting a pivot position for the first frame. The second adjustment joint comprises a third element arranged in one of the first frame and the second (further) frame and forms a third contact surface, and a fourth element arranged in the other of the first frame and the second (further) frame and forms a fourth contact surface. The third element and the fourth element are arranged to abut at the third and fourth contact surfaces. The third element is further arranged to be moved along a linear axis that traverses the second pivot axis and that extends trough a plane of the contact surfaces of the third and fourth elements. At least one of the contact surfaces of the third and fourth elements is curved. The third and fourth elements are arranged to be magnetically connected during abutment, thereby allowing a second pivot position of the frame relative to the second (further) frame to be adjusted by a linear movement of the third element. The support frame, and any image capturing device arranged therein, are thereby also adjusted by the linear movement of the third element together with the frame since the first frame and the support frame are connected to each other via the first pivot joint and the first adjustment joint.

A mount of this embodiment comprises two adjustment joints, that each is based on the same principle. That is, each adjustment joint is arranged to adjust a frame (first/fixed frame or support frame) to rotate around a pivot axis, and each adjustment joint comprises a pair of elements that are located on different parts (support frame, fixed/first frame, and second (further) frame) and are magnetically connected to each other. One element in each element pair is arranged to be moved along a linear axis, and one or each element contact surface in the element pairs are curved. By arranged two adjustment joints, the image capturing device may be adjusted in two directions that are defined by the pivot axes. The first pivot axis may be selected to coincide with a tilt axis for the image capturing device, and the second (further) pivot axis may be selected to coincide with a pan axis for the image capturing device, or vice versa. Hence, the mount may be arranged to allow adjustment of the image capturing device in a pan direction and in a tilt direction.

According to a second aspect, a system aligns a first image capturing device field of view with a second image capturing device field of view. The system comprises a first mount for the first image capturing device, the first mount being arranged to fixedly support the first image capturing device, and a second mount according to the first aspect and for the second image capturing device. A pivot position of the second image capturing device may be adjusted so as to align the second image capturing device field of view with the first image capturing device field of view. The system may be actively used during assembly of pairwise arranged image capturing devices that are intended to have the same field of view (or at least mutually aligned fields of view) during use. Non-limiting examples of such an arrangement are a visual light camera paired with a thermal camera, or a visual light camera paired with a radar device.

The above embodiments discussed in connection to the first aspect apply to the second aspect as well.

According to a third aspect, a method aligns a first image capturing device field of view with a second image capturing device field of view. The method comprises:
fixedly mounting the first image capturing device
mounting the second image capturing device in a mount according to the first aspect,
based on a field of view of the first image capturing device, determining a target field of view for the second image capturing device, and
adjusting a pivot position of the second image capturing device to reach the target field of view.

The method may be executed during assembly of image capturing devices. The method may be performed by use of a mount according to the second aspect.

A further scope of applicability of the present teachings will become apparent from the detailed description given below. However, it should be understood that the detailed description and specific examples, while indicating preferred embodiments, are given by way of illustration only, since various changes and modifications within the scope of the teachings will become apparent to those skilled in the art from this detailed description.

Hence, it is to be understood that the teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The teachings will now be described in more detail by way of example and with reference to the accompanying schematic drawings, in which.

DETAILED DESCRIPTION OF EMBODIMENTS

Figure 1:
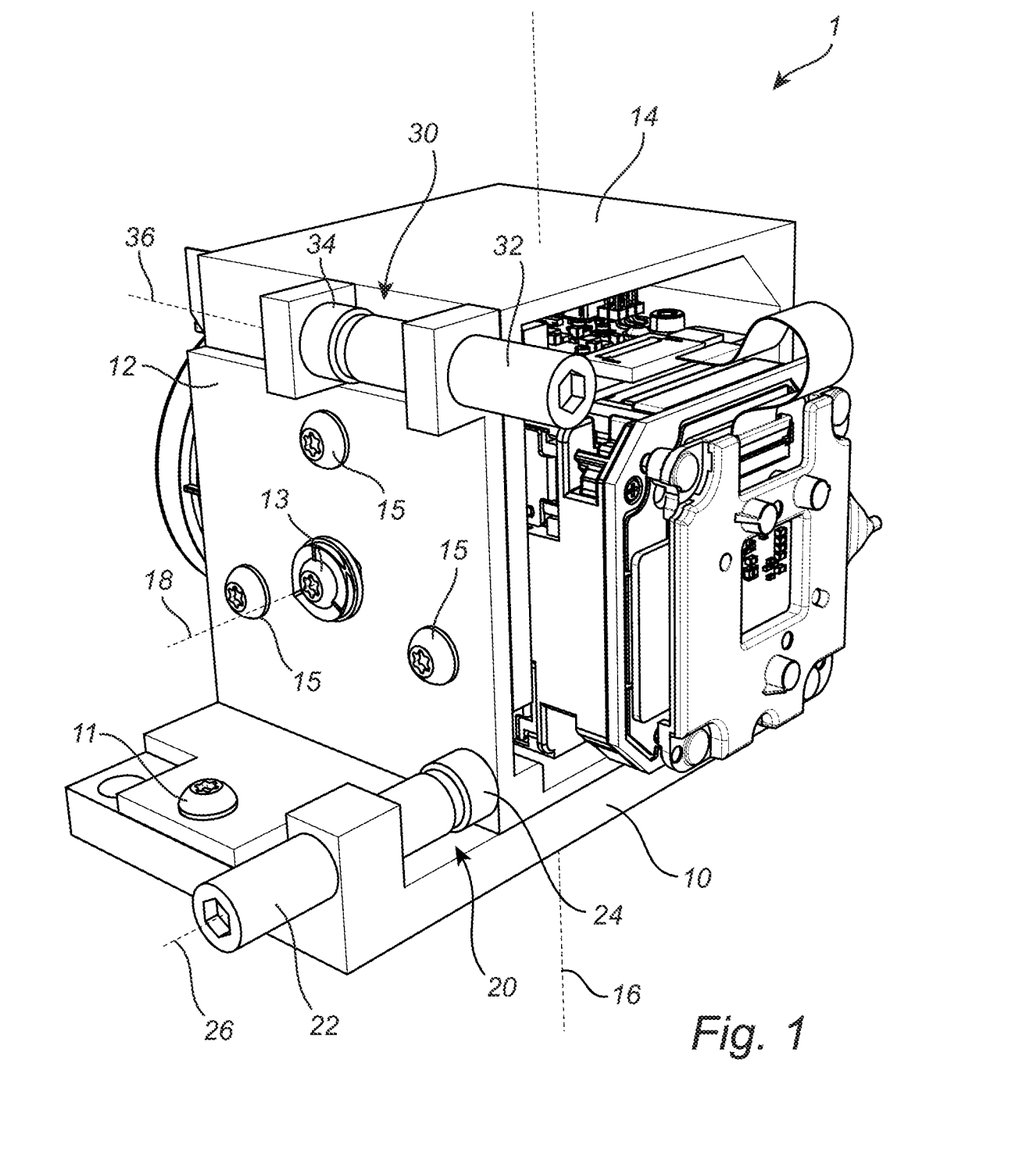
FIG. 1 illustrates a mount according to an embodiment.

A mount 1 comprising a support frame 14, a fixed (first) frame 12, and a further (second) frame 10. The fixed frame 12 and the further frame 10 will also be referred to as first frame 12 and second frame 10 in this description.

An image capturing device 19 in the form of a visual light image sensor unit with optics is located in and attached to the support frame 14. The first frame 12 and the support frame 14 are attached to each other by a screw 13 that forms a pivot joint. The screw 13 is arranged and configured such that the support frame 14 and the first frame 12 are easily moved relative to each other. The screw 13 defines a pivot axis 18 that, in turn, defines the movement of the support frame 14 relative to the first frame 12. That is, the support frame 14 can rotate about the pivot axis 18. In this embodiment, the screw 13 is positioned such that the pivot axis 18 coincide with a tilt axis of the image capturing device 19. In other words, the support frame 14, and thus the image capturing device 19, is allowed to move relative to the first frame 12 by tilting.

In order to control the pivot movement, in this case the tilt movement, of the support frame 14, an adjustment joint 30 is arranged. The adjustment joint 30 comprises a first element 32 and a second element 34. The first element 32 comprises a screw that is provided through a fixed part of the first frame 12. The screw is arranged to move, when screwed, along a linear axis 36. The second element 34 comprises a magnetic material section that is fixedly attached to the support frame 14.

It should be noted that the first and second elements may be located in an opposite manner, that is the first element 32 is attached to the support frame 14 and the second element 34 is attached to the first frame 12.

The first element 32 abuts the second element 34 at contact surfaces of the elements 32, 34. The form of the contact surfaces will be discussed in detail later. The connection between the first element 32 and the second element 34 is magnetic. The first and second elements 32, 34 are arranged with magnetic connectors at their abutting ends, where their contact surfaces are provided, such that a magnetic connection is provided. The ends may comprise ferrite materials or an electromagnetic connector (not illustrated) that is connected to and powered by, e.g., the image capturing device 19. Thanks to the magnetic force, that adds an attraction force between the contact surfaces, there is no need to add a counteracting force to the push force of the screw. Hence, a more compact adjustment solution is provided.

The linear axis 36 is arranged such that is traverses the pivot axis 18. By this features, a force applied to the contact surface of the second element 34 along the linear axis 36 will translate to a rotational movement of the support frame 14 around the pivot axis 18.

The linear axis 36 extends through a plane of the contact surfaces. In other words, the screw of the first element 32 is arranged to, at least partly, act in a direction that extends through a plane of the contact surfaces. By plane of the contact surfaces is meant a plane that at least part of each contact surface lie in. In the case of a flat contact surface, the plane is defined by the surface. In the case of a curved contact surface, there are many possible planes being the tangent planes to the surface.

The screw is thereby arranged to push against, or pull from, the contact surfaces. By the magnetic connection, the contact surfaces are connected in an abutting mode even when the screw is moved back or forth. At least one of the contact surfaces is curved, which makes an abutment between the contact surfaces possible to maintain in different rotational positions of the support frame 14.

Figure 2:
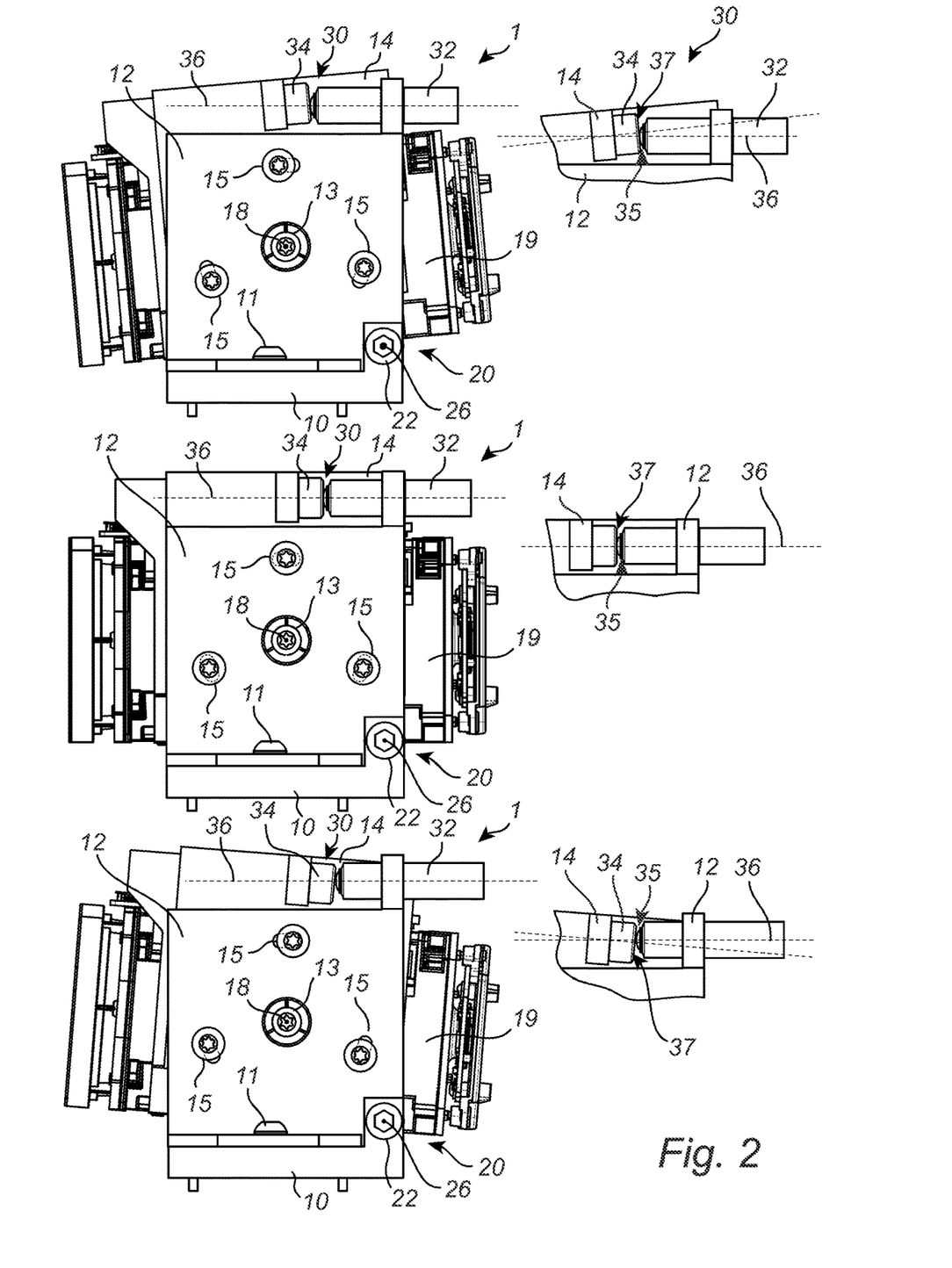
FIG. 2 illustrates different tilt positions for an image capturing device arranged in a mount according to an embodiment.

Going more into detail, FIG. 2 illustrates three different rotational positions of the support frame 14, and thus the image capturing device 19 for the mount 1 in FIG. 1. On the left side, a side view of the mount 1 for the different rotational positions are given, and on the right side, close-up views of the adjustment joint 30 in the different rotational positions are provided.

Starting from the top, the support frame 14, and image capturing device 19, are arranged in a tilted-down position. The screw of the first element 32 is inserted far along the linear axis 36 and has hence pushed the second element 34 far along the same axis. Since the linear axis 36 traverses the pivot axis 18, the support frame 14 will be rotated about the pivot axis 18 by the insertion of the screw. Hence, the image capturing device 19 is further tilted as the screw is inserted further.

Looking at this position's close-up on the right, a flat contact surface 37 of the second element 34 and a curved contact surface 35 of the first element 32 can be seen. The first and second elements 32, 34 abuts at the contact surfaces 34, 37, and in particular at a contact point thereof. The contact point is in this position far down on the second element contact surface 37.

Going to the intermediate illustration, a straight-up tilt position for the support frame 14, and thus the image capturing device 19, is illustrated. The screw of the second element 32 has been unscrewed a bit and due to the magnetic connection between the first and second elements 32, 34, the support frame 14 is pulled backwards along with the screw.

This movement straightens up the image capturing device 19 so that it can be brought to an upright position.

Looking at the close-up for this position, it is noted that the contact point of the contact surfaces 35, 37 has moved upwards on the second element contact surface 37.

If the screw is unscrewed even further, the support frame 14 continues to tilt upwards along the rotational direction that is defined by the pivot axis 18. As can be seen in the close-up for this position, the contact point of the contact surfaces 35, 37 has moved even more upwards and is now almost at the uppermost area of the second element contact surface 37.

The mount 1 can thus be adjusted by moving the first element 32 along the linear axis 36 back and forth. The movement of the first element 32 may be manually performed or be motorized by connecting, e.g., a step motor (not illustrated) to the first element. The movement may be controlled by a software that performs adjustment for specific purposes. The use of a step motor may provide a precise and well-controlled adjustment.

When the adjustment is done and a desired position of the image adjusting device 19 has been reached, the position may be locked by fixing organs in the form of screws 11, 15. The screws 15 are arranged to lock movement about the first pivot axis 18, and the screw 11 is arranged to lock movement about the second pivot axis 16. The screws 11, 15 may be arranged to press against the second frame 10 and the support frame 14, respectively, to provide a fixating friction force when adjusted inwards. Alternatively, screw holes may be arranged in the second frame 10 and in the support frame 14 for receiving the screws 11, 15.

The design of the first and second elements 32, 34 and in particular their contact surfaces 35, 37, defined the rotational range that is provided for the support frame 14. If the contact surface 37 in the illustrated example was made larger, a larger tilt span would be allowed for the support frame 14. The mount 1 may thus be designed to fit different needs for rotational movement, thus provided a flexible solution.

As has been noted, the contact point, at which the contact surfaces abut in at a moment in time, changes with the adjustment, i.e. with the rotational position of the support frame 14. In other words, when the first element 32, i.e. the screw in this case, is moved, the rotational position of the support frame 14 is changed and the contact point moves along the contact surfaces 35, 37 of the first and second elements 32, 34. The movement is made possible by that at least one of the contact surfaces 35, 37 are curved.

Figure 3A:
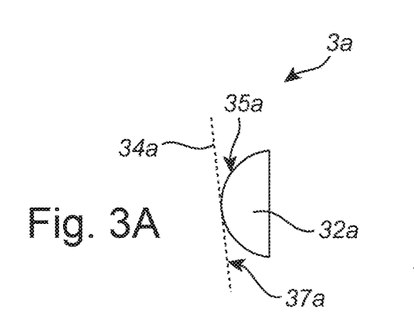
FIG. 3A-3D illustrate different forms of contact surfaces in an adjustment joint according to different embodiments.

The contact surfaces 35, 37 may have different shapes as long as at least one of them is curved. FIG. 3 illustrates different non-limiting examples of such contact surfaces. In FIG. 3A, a curved contact surface 35*a* of a first element 32*a* abuts a flat contact surface 37*a* of a second element 34*a*. This example is similar to the configuration illustrated in FIG. 2.

Figure 3B:
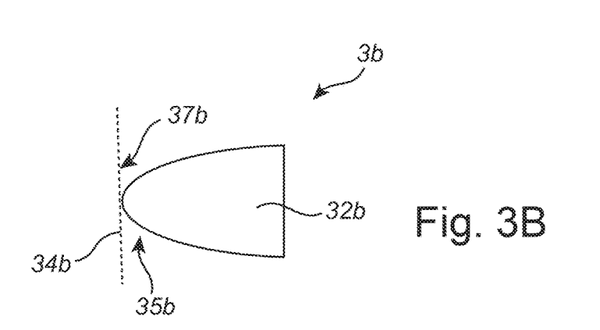

FIG. 3B provides a similar configuration. A curved contact surface 35*b* of a first element 32*b* abuts a flat contact surface 37*b* of a second element 34*b*. The curvature of the contact surface 35*b* is different than in previous examples. The curvature may be chosen such that the support frame 14 moves at different paces in different rotational position. This might be a beneficial configuration if a more precise adjustment is desired in some rotational position range, and speed is prioritized above precision outside that range. It is possible for a skilled person in the art of mechanical construction to design the contact surfaces to achieve different purposes such as the one exemplified above, much as the skilled person could be able to construct cam curves for different types of interactions in an analogous manner.

Figure 3C:
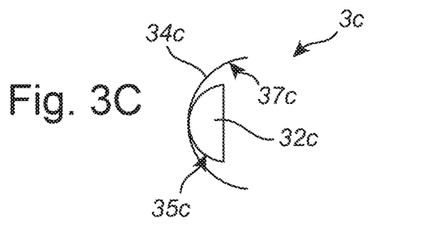

FIG. 3C illustrates another configuration. A convex (curved) contact surface 35*c* of a first element 32*c* abuts a concave (also curved) contact surface 37*c* of a second element 34*c*. An advantage with this configuration is that it is compact.

Figure 3D:
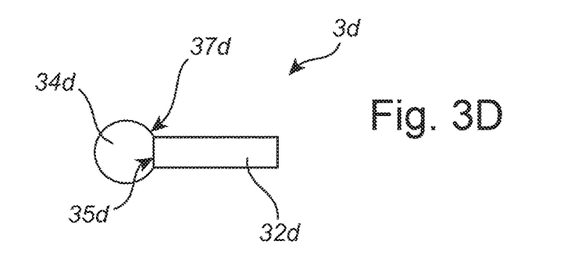

FIG. 3D illustrates yet another configuration. A flat contact surface 35*d* of a first element 32*d* abuts a curved contact surface 37*d* of a second element 34*d*. Here, the first element 32*d* may form a rod with a flat end surface that forms the contact surface 35*d*. The second element 34*d* may form a second rod, that is arranged perpendicular to the first element 32*d*. The curved side surface of the second element 34*d* forms the curved contact surface 37*d*.

As exemplified, many different configurations for the adjustment joint are possible to achieve the features and purpose of the adjustment joint. A not illustrated example is a configuration with a convex (curved) contact surface of a first element that abuts a convex (also curved) contact surface of a second element.

Returning to FIG. 1, a second adjustment joint 20 is provided based on the same principle as the first adjustment joint 30. The second adjustment joint 20 connects the first frame 12 with a further frame 10, which also will be referred to as the second frame 10. The first frame 12 is further connected to the second frame 10 via a screw (not illustrated) at an underside of the first frame 12. The screw defines a second pivot axis 16.

The second adjustment joint 20 is similarly constructed as the first adjustment joint 30. That is, the second adjustment joint 20 comprises a third element 22 and a fourth element 24 which are located on different ones of the first frame 12 and the second frame 10. The third element 22 is arranged to be adjusted along a linear axis 26. The third element 22 may comprise, e.g., a screw or the like that is adjustable along the linear axis 26.

The third element 22 and the fourth element 24 are arranged to abut at contact surfaces of the third and fourth elements 22, 24. As for the first adjustment joint 30, at least one of the third and fourth elements 22, 24 is curved. The non-limiting examples of how the contact surfaces of the first adjustment joint 30 may be formed, illustrated in FIG. 3A-3D, may be applied to the third and fourth element contact surfaces 22, 24 as well.

The third and fourth elements are magnetically connected during abutment by their arrangement. In other words, the third and fourth elements 22, 24, in particular their contact surfaces are arranged to be magnetically attracted to each other during abutment. The second adjustment joint 20 is further arranged such that the linear axis 26 traverses the second pivot axis 16 and extends through a plane of the contact surfaces of the third and fourth elements 22, 24.

When the third element 22 is moved along the linear axis 26, a push or pull force is applied to the fourth element 24 and, in turn, to the first frame 12. The first frame 12 and the second frame 10 will thus move relative to each other. The second frame 10 may be fixedly attached to a base or similar, and thus it is the first frame 12 that is moved relative to the second frame 10. By that the support frame 14 is attached to the first frame 12, the support frame 14 moves along with the first frame 12 when the third element 22 is adjusted.

The second pivot axis 16 may be, as in the illustrated example, arranged to coincide with a panning axis of the image capturing device 19. Hence, in the illustrated embodiment, a tilt angle of the image capturing device 19 may be adjusted by the first adjustment joint 30 and a panning angle of the image capturing device may be adjusted by the second adjustment joint 20.

The magnetic connection in the first and second adjustment joints 30, 20 may be selected such that the abutment between contact surfaces may be released when a separating force between the first and second elements 32, 34, or third or fourth elements 22, 24, exceeds a predetermined threshold. The threshold is defined by the design (selection) of the magnetic components/connectors in respective adjustment joint 20, 30. By this feature, the first frame 12 and the support frame 14, and/or the first frame 12 and the second frame 10, may disconnect from each other if the mount 1 is subjected to an external force or impact, which may protect components thereof.

As disclosed, the first frame 12 is connected to the support frame 14 in a corresponding way as the second frame 10 to the first frame 12. Even though the terminology "first frame", "support frame" and "second frame" are used for specific structures in the drawings when disclosing the different embodiment, the claims should be interpreted in a wider sense. Specifically, the term fixed frame, as used in the claims, may correspond to the first frame 12 or the second frame 10 in the illustrated embodiment of FIG. 1, depending on which parts of the mount 1 the claim is read on.

Figure 4:
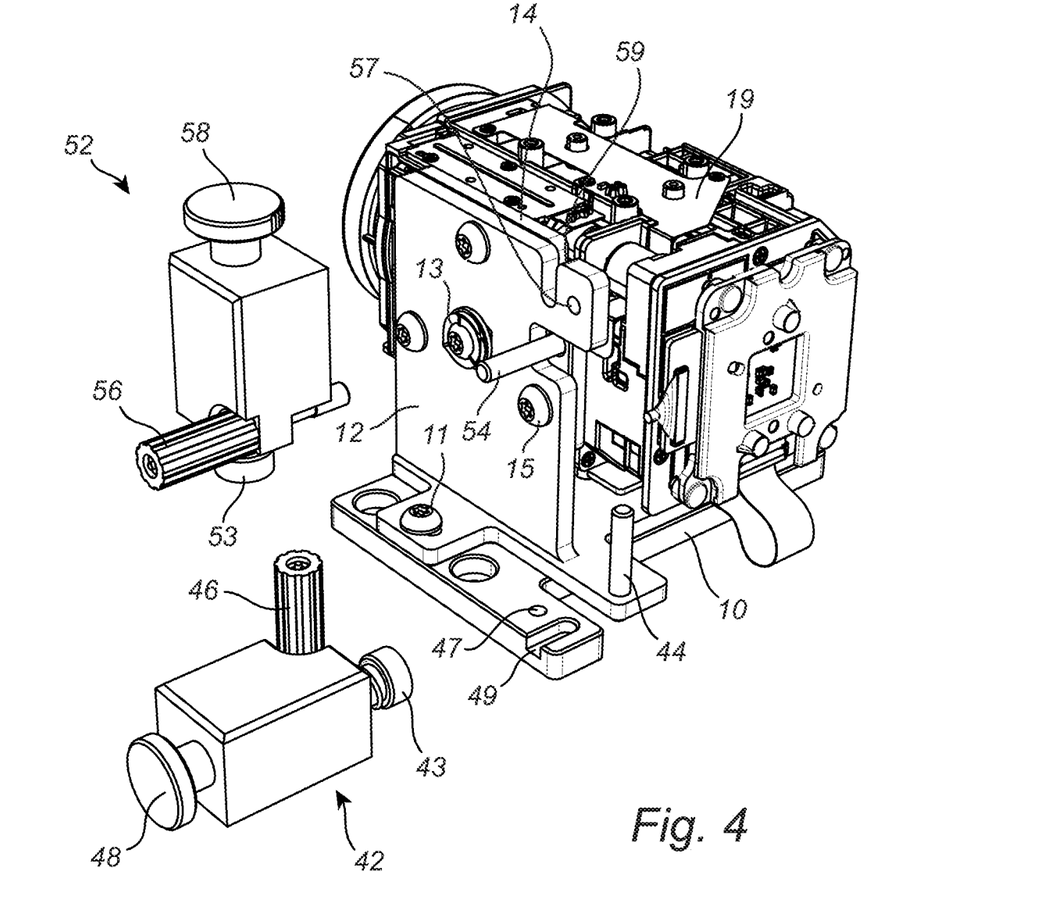
FIG. 4 disclosed a mount according to another embodiment.

Another embodiment of the mount 1 is illustrated in FIG. 4. The mount 1 is constructed on the same principles as in the previous embodiment, that with an adjustment joint connecting a support frame 14 and a first frame 12, and with a second adjustment joint connecting the first frame 12 and a second frame 10. However, in this embodiment a first element 52, corresponding to the first element 22 of the previous embodiment, is arranged to be retrofitted to the first frame 12. This is accomplished by that the first element 52 comprises an attachment screw 56 to be inserted into a screw hole 57 so as to attach the first element 52 to the first frame 12. Rotation of the first element 52 may be prevented by that a part of the first element 52 is inserted into a recess 59 or similar provided in the first frame 12. The first element 52 also includes an adjustment screw 58 arranged with a magnet 53 at one of its ends. The magnet 53 provides a contact surface which, when the first element 52 is attached to the first frame 12, abuts a second element 54 in the form of a rod. The side surface of the rod forms a curved surface which allows adjustment by moving the adjustment screw 58 along a linear axis (not illustrated). The same arrangement for the linear axis, first and second elements 52, 54, etc. relative to a pivot axis (defined by a screw 13, as disclosed for the previous embodiment) apply to this embodiment as well and will not be repeated.

The second adjustment joint also comprises a retrofittable third element 42 that is attachable to the second frame 10 by an attachment screw 46 that is inserted into a screw hole 47. Rotation of the third element 42 may be prevented by that a part of the third element 42 is inserted into a recess 49 or similar provided in the first frame 12. The adjustment is provided by an adjustment screw 48 and a magnet 43 located at its end, that attaches to a curved side surface of a rod that is part of a fourth element 44. A pivot position of the first frame 12, relative to the second frame 10, is thereby adjustable about a pivot axis that is defined by a screw (not illustrated) located underneath the image capturing device 19.

An advantage with the retrofitted elements 52, 54 is that one element may be used to adjust many mounts 1 of the exemplified type, for example during assembly of image capturing devices 19. Another advantage is that it is more difficult to adjust the mount 1 without the tool, which at least reduces the risk of adjusting the mount 1 by mistake or in an uncontrolled manner.

FIG. 4 also provides an example of that the curved surface may be provided in the second element 54 (or in the fourth element 44), contrary to the embodiment illustrated in FIG. 1.

Figure 5:
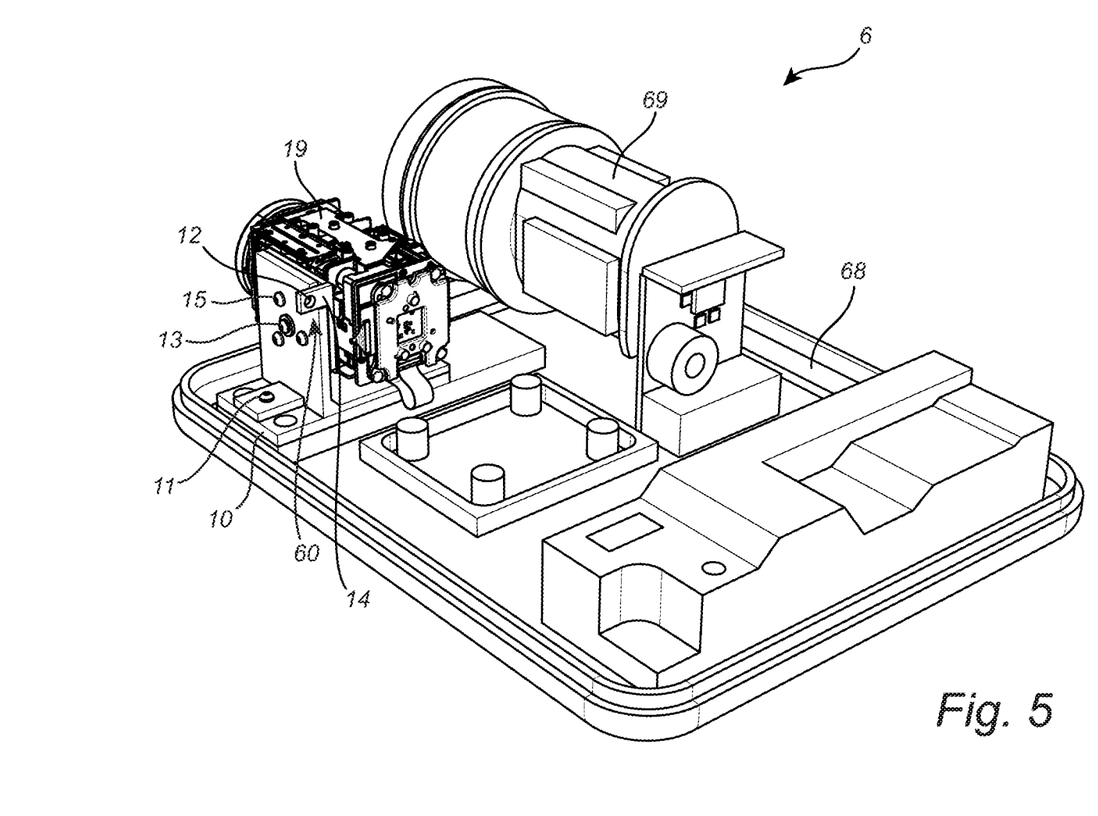
FIG. 5 discloses a system with paired cameras where one of them is adjustable with a mount according to an embodiment.

FIG. 5 illustrates a system 6 for aligning a first image capturing device 69 to a second image capturing device 19. The system has a base structure 68 that forms a first mount for the first image capturing device 69. The first image capturing device 69 is fixedly attached to the base structure 68 by any suitable and known attachment method. The second image capturing device 19 is attached to the base structure 68 via the mount 1 with the same or similar features and functions as disclosed in previous embodiments. The mount 1 enables an adjustment of the first image capturing device 19 by an adjustment joint 60. The adjustment joint 60 comprises a second element 64 that is attached to the first frame 12 of the mount 1. When adjustment is required, for example during an assembly process, an external (separate) adjustment rig (not illustrated) is fitted to the system 6, and in particular to the second element 64. The adjustment rig comprises a first element (not illustrated) that magnetically connects to the second element 64 such that contact surfaces of the first element and the second element 64 abut. As in previous embodiments, at least one of the contact surfaces is curved. When the adjustment rig is connected, adjustment of the image capturing device 19 may be performed in a manner that is disclosed for previous embodiments.

A purpose of the system 6 with two image capturing devices 19, 69, one being adjustable and the other one being fixed, is to enable alignment of the image capturing devices' fields of view. This is a task performed during assembly of camera systems such as the system 6. The first image capturing device 19 may be a visual light camera. The second image capturing device 69 may be a thermal camera. These cameras may be located next to each other in the system 6 to work together for acquiring image data of the same scene. It is desired to be able to precisely align the cameras' fields of view relative to each other.

An example of an adjustment method that can be performed with the exemplified system 6 and the adjustment rig is as follows. The first and second image capturing devices 69, 19 are mounted to the base structure 68, directly or via a mount. A field of view of the first (fixed) image capturing device 69 is determined by, e.g., acquiring image data with the device and analyzing (manually or automatically) that image data. Based on the field of view, a target field of view is determined (manually or automatically) for the second image capturing device 19. The target field of view corresponds to the field of view of the second image capturing device 19 that provided desired characteristics. Typically, it is that the cameras are looking at the same area, but it could also be that the camera have an overlapping field of view to a certain extent. Through already known methods, it is possible to determine which field of view that is desired for the second image capturing device 19, i.e. the target field of view, in order to achieve those characteristics. Thereafter, the second image capturing device 19 may be adjusted to reach the target field of view by use of the mount 1, and in particular the adjustment joint 60 therein. Not illustrated in FIG. 6, but which could as well be arranged in the mount 1, is a further adjustment joint to provide a further direction of adjustment for the second image capturing device 19.

It is noted that the imaging devices may be of other types, for example laser-based imaging systems such as LIDAR systems, and that anyone of the cameras (in the exemplified embodiment any one of the visual light camera 19 and the thermal camera 69) may be arranged adjustable and the other one fixed. Furthermore, both cameras of such a system may be arranged in mounts according to the inventive concept, which allow adjustment of each of the cameras.

The person skilled in the art realizes that the present teachings are by no means limited to the embodiments described above. On the contrary, many modifications and variations are possible within the scope of the appended claims. For example, the mount 1 may be implemented in other configurations than the ones discussed and illustrated herein. Moreover, other (known) types of magnetically connections between contact surfaces may be used. The adjustment joints may be differently configured without deviating from the described and exemplified principles.

REFERENCE NUMERALS 1 mount
10 further/second frame
11 screw
12 fixed/first frame
13 screw
14 support frame
15 screw
16 (second) pivot axis
18 (first) pivot axis
19 image capturing device
20 (second) adjustment joint
22 third element
24 fourth element
26 linear axis
30 (first) adjustment joint
32 first element
32a first element
32b first element
32c first element
32d first element
34 second element
34a second element
34b second element
34c second element
34d second element
35 contact surface
35a curved contact surface
35b curved contact surface
35c curved contact surface
35d flat contact surface
36 linear axis
37 contact surface
37a flat contact surface
37b flat contact surface
37c curved contact surface
37d curved contact surface
42 third element
43 magnet
44 fourth element
46 attachment screw
47 screw hole
48 adjustment screw
49 recess
52 first element
53 magnet
54 second element
56 attachment screw
57 screw hole
58 adjustment screw
59 recess
6 system
60 adjustment joint
64 second element
68 base structure
69 first image capturing device

The invention claimed is:

1. A mount for an image capturing device comprising
a fixed frame, and
a support frame arranged to support an image capturing device,
wherein the support frame is attached to the fixed frame by:
a pivot joint defining a pivot axis for the support frame relative to the fixed frame, and
an adjustment joint for adjusting a pivot position for the support frame comprising
a first element arranged in one of the support frame and the fixed frame so as to be retrofittable thereto, and forming a first contact surface, and
a second element arranged in the other of the support frame and the fixed frame and forming a second contact surface,
wherein the first element and the second element are arranged to abut at the first and second contact surfaces,
wherein the first element is further arranged to be moved along a linear axis that traverses the pivot axis and that extends through a plane of the contact surfaces,
wherein at least one of the contact surfaces is curved, and
wherein the first and second elements are arranged to be magnetically connected during abutment, thereby allowing a pivot position of the support frame relative to the fixed frame to be adjusted by a linear movement of the first element.

2. The mount according to claim 1, further comprising fixing organs arranged to fix the pivot position of the support frame.

3. The mount according to claim 1, wherein the linear axis is perpendicular to the pivot axis.

4. The mount according to claim 1, wherein one of the first and second elements comprises a rod forming a curved contact surface and wherein the other of the first and second elements forms a flat contact surface.

5. The mount according to claim 1, wherein the support frame carries an image capturing device, and wherein the pivot axis is a tilt or pan axis for the image capturing device.

6. The mount according to claim 1, wherein said one of the support frame and the fixed frame comprises an attachment element, and wherein the first element comprises a corresponding attachment means to connect to the attachment element.

7. The mount according to claim 6, wherein said one of the support frame and the fixed frame is provided with a recess, and wherein the first element comprises a part being adapted to be inserted in the recess when attached to said one of the support frame and the fixed frame such that rotation of the first element is prevented.

8. The mount according to claim 1, further comprising a further frame attached to the fixed frame by:
a second pivot joint defining a second pivot axis for the fixed frame relative to the further frame, and
a second adjustment joint for adjusting a pivot position for the fixed frame, wherein the second adjustment joint comprises a third element arranged in one of the fixed frame and the further frame so as to be retrofittable thereto, and forming a third contact surface, and a fourth element arranged in the other of the fixed frame and the further frame and forming a fourth contact surface, wherein the third element and the fourth element are arranged to abut at the third and fourth contact surfaces, wherein the third element is further arranged to be moved along a linear axis that traverses the second pivot axis and that extends through a plane of the contact surfaces of the third and fourth elements, wherein at least one of the contact surfaces of the third and fourth elements is curved, and wherein the third and fourth elements are arranged to be magnetically connected during abutment, thereby allowing a second pivot position of the fixed frame relative to the further frame to be adjusted by a linear movement of the third element.

9. The mount according to claim 8, wherein said one of the fixed frame and the further frame comprises a further attachment element, and wherein the third element comprises a corresponding further attachment means to connect to the further attachment element.

10. The mount according to claim 8, wherein the first pivot axis is a tilt axis for the image capturing device and the second pivot axis is a pan axis for the image capturing device.

11. A system for aligning a first image capturing device field of view with a second image capturing device field of view, the system comprising:
a first mount for the first image capturing device, the first mount being arranged to fixedly support the first image capturing device, and
a second mount for the second image capturing device comprising
a fixed frame, and
a support frame arranged to support an image capturing device,
wherein the support frame is attached to the fixed frame by:
a pivot joint defining a pivot axis for the support frame relative to the fixed frame, and
an adjustment joint for adjusting a pivot position for the support frame comprising
a first element arranged in one of the support frame and the fixed frame so as to be retrofittable thereto, and forming a first contact surface, and
a second element arranged in the other of the support frame and the fixed frame and forming a second contact surface,
wherein the first element and the second element are arranged to abut at the first and second contact surfaces,
wherein the first element is further arranged to be moved along a linear axis that traverses the pivot axis and that extends through a plane of the contact surfaces,
wherein at least one of the contact surfaces is curved, and
wherein the first and second elements are arranged to be magnetically connected during abutment, thereby allowing a pivot position of the support frame relative to the fixed frame to be adjusted by a linear movement of the first element;
whereby a pivot position of the second image capturing device may be adjusted so as to align the second image capturing device field of view with the first image capturing device field of view.

12. A method for aligning a first image capturing device field of view with a second image capturing device field of view, the method comprising
fixedly mounting the first image capturing device,
mounting the second image capturing device in a mount comprising
a fixed frame, and
a support frame arranged to support an image capturing device,
wherein the support frame is attached to the fixed frame by:
a pivot joint defining a pivot axis for the support frame relative to the fixed frame, and
an adjustment joint for adjusting a pivot position for the support frame comprising
a first element arranged in one of the support frame and the fixed frame so as to be retrofittable thereto, and forming a first contact surface, and
a second element arranged in the other of the support frame and the fixed frame and forming a second contact surface,
wherein the first element and the second element are arranged to abut at the first and second contact surfaces,
wherein the first element is further arranged to be moved along a linear axis that traverses the pivot axis and that extends through a plane of the contact surfaces,
wherein at least one of the contact surfaces is curved, and
wherein the first and second elements are arranged to be magnetically connected during abutment, thereby allowing a pivot position of the support frame relative to the fixed frame to be adjusted by a linear movement of the first element;
based on a field of view of the first image capturing device, determining a target field of view for the second image capturing device, and
adjusting a pivot position of the second image capturing device to reach the target field of view.

* * * * *